US008914304B2

(12) United States Patent
Coates et al.

(10) Patent No.: US 8,914,304 B2
(45) Date of Patent: Dec. 16, 2014

(54) SYSTEMS AND METHODS FOR MODELING TELECOMMUNICATION SWITCH INVESTMENTS

(71) Applicants: Verizon Services Corp., Arlington, VA (US); Verizon Corporate Services Group Inc., New York, NY (US)

(72) Inventors: Christopher Coates, West Paterson, NJ (US); Robert Colamussi, Huntington, NY (US); Louis Botte, Rockville Centre, NY (US); Robert T. Johnson, Coppell, TX (US); Cesar Davila, Carrollton, TX (US); Laura Jaquez, Lewisville, TX (US); Jon Baggett, Mansfield, TX (US); Vanessa Bell, Irving, TX (US); James Gunther, Colleyville, TX (US); James Hassenzahl, Euless, TX (US); Nancy Matt, Montville, NJ (US); Elvira Djonovic, Hicksville, NY (US); Michael Joedecke, New York, NY (US); Esther Fong, New York, NY (US); Fredrick Miller, Whitman, MA (US); Joan Engler, Freehold, NJ (US); Dennis Adams, Farmers Branch, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/908,383

(22) Filed: Jun. 3, 2013

(65) Prior Publication Data

US 2013/0258903 A1    Oct. 3, 2013

Related U.S. Application Data

(62) Division of application No. 11/264,049, filed on Nov. 2, 2005, now Pat. No. 8,478,669.

(51) Int. Cl.
*G06Q 40/00*    (2012.01)

(Continued)

(52) U.S. Cl.
CPC ............ *H04L 41/12* (2013.01); *H04B 7/18541* (2013.01); *H04B 7/1856* (2013.01);

(Continued)

(58) Field of Classification Search
CPC .............. H04W 84/06; H04B 7/18539; H04B 7/18541; H04B 7/1856; H04B 7/18563
USPC ............ 705/35, 10; 455/446; 370/238, 230.1, 370/537, 442, 295, 535, 486, 468, 466; 701/14; 348/E7.07; 725/109; 707/792
See application file for complete search history.

(56) References Cited

U.S. PATENT DOCUMENTS 6,393,290 B1 * 5/2002 Ufongene ...................... 455/446
6,459,708 B1 * 10/2002 Cox et al. ...................... 370/537

(Continued)

OTHER PUBLICATIONS

"Digest of Technical Information," Telcordia Technologies, Inc., vol. 17, No. 11, 34 pages, Nov. 2000.
Taylor, et al., "An Economic Evaluation of Network Cost Models," National Economic Research Associates (NERA), 79 pages, Aug. 7, 2000.

*Primary Examiner* — Behrang Badii

(57) ABSTRACT

In one of many possible embodiments, a system is provided for modeling telecommunication switch investments. The exemplary system includes a telecommunication switch modeling application configured to determine equipment quantities having capacity to satisfy switch design parameters descriptive of at least one model telecommunication switch, and calculate model investments associated with the equipment quantities. The exemplary system also includes a telecommunication switch investment modeling application configured to weight the model investments in accordance with at least one of a network parameter descriptive of an actual telecommunication switch and a "what-if" input descriptive of a hypothetical telecommunication switch configuration to form weighted investments that are specific to at least one of the actual telecommunication switch and the hypothetical telecommunication switch configuration.

18 Claims, 3 Drawing Sheets

(51) Int. Cl.
*H04L 12/24* (2006.01)
*G06Q 30/02* (2012.01)
*H04B 7/185* (2006.01)
*H04W 84/06* (2009.01)

(52) U.S. Cl.
CPC .......... *H04B 7/18539* (2013.01); *H04W 84/06* (2013.01); *H04B 7/18563* (2013.01); *G06Q 30/02* (2013.01)
USPC .............................. 705/35; 455/428; 709/220

(56) References Cited

U.S. PATENT DOCUMENTS

| | | | |
|---:|---|---|---|
| 6,556,962 B1 * | 4/2003 | Patra | 703/14 |
| 2005/0083844 A1 * | 4/2005 | Zhu et al. | 370/230.1 |
| 2007/0053300 A1 * | 3/2007 | Zhu et al. | 370/238 |
| 2007/0265907 A1 * | 11/2007 | Adduci et al. | 705/10 |

\* cited by examiner

SYSTEMS AND METHODS FOR MODELING TELECOMMUNICATION SWITCH INVESTMENTS

CROSS REFERENCE TO RELATED APPLICATIONS

This application is a divisional of U.S. patent application Ser. No. 11/264,049, filed on Nov. 2, 2005, the contents of which are hereby incorporated by reference in its entirety.

BACKGROUND INFORMATION

Communication networks facilitate transmission of many types of communication signals between endpoints. In packet-switched networks, for example, equipment such as routers and switches are typically used to route communication signals over pathways from originating locations toward target destinations. In circuit-switched networks such as conventional public switched telephone networks ("PSTNs"), switches are commonly used to form communication circuits over transmission media. The switches then direct communication signals over the circuits toward target destinations.

Because of the proliferation and complexity of modern communications, equipment used in many communication networks is sophisticated and expensive. For example, telecommunications switches deployed in a PSTN are costly and complicated devices. Such switches typically include many intricate parts configured to support switching functions. The configuration of equipment in a switch largely determines the capacity of the switch for handling communication traffic. For example, the number of line termination cards in a switch determines, at least in part, the maximum number of transmission lines that can be terminated by the switch.

Telecommunication switches come in a variety of sizes, technologies, and configurations. Accordingly, a particular switch may be well-suited for a certain network implementation but ill-suited for another network implementation. The design or selection of a switch is largely driven by the traffic demands to be handled by the switch. In particular, a selected switch should provide sufficient capacity to handle relevant traffic demands, without providing an overly excessive amount of capacity that would waste resources and increase costs. Consequently, a typical communication network usually employs a variety of different switches across the network. In a PSTN, for example, the switches generally include host end-office switches, remote switches, tandem switches, end-office/tandem combination switches, and traffic operator position system ("TOPS") switches.

The complexity of the equipment used in communication networks causes network providers to incur substantial expenses related to the design, implementation, operation, maintenance, and regulatory compliance associated with network devices, including telecommunication switches. Tools have been developed to assist network providers in estimating the investments associated with network devices, particularly the investments associated with network switches. The existing tools have been particularly designed to help automate techniques used for estimating such investments.

While existing tools have provided some automation to conventional investment estimation techniques, the tools exhibit several shortcomings. For example, existing switch investment modeling tools fail to provide component-level quantity and price information to end users and typically provide only high-level output such as a top-level, total switch investment, or a number of subtotal investment estimates for partitioned sections of the switch. The existing tools do not provide end users with in-depth information showing how investment estimates are ascertained or how a switch is partitioned according to investment categories.

Moreover, existing tools are inflexible because device modeling computations typically have to be rerun each time input data is changed. Unfortunately, each computation of output can require substantial processing time, even for an adjustment of a single input variable. In other words, the existing tools are not equipped to perform efficient sensitivity analyses for varied switch design parameters.

Existing tools also require significant man-hours to operate. In particular, operators spend many hours organizing vast amounts of inputs that are required by the existing tools. Moreover, operators of many existing tools must sift through large amounts of outputs, many of which may not be relevant. Existing tools that have attempted to reduce the number of inputs or outputs have suffered a loss of accuracy because in order to reduce the inputs or outputs, the tools have relied upon less accurate averaging techniques for estimating switch investments. Such tools have turned out to be relatively inaccurate for modeling many different types of network devices. In short, existing tools for estimating switching investments are cumbersome and time consuming to operate, or often provide outputs that are irrelevant, inaccurate, or difficult to decipher.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Figure 1:
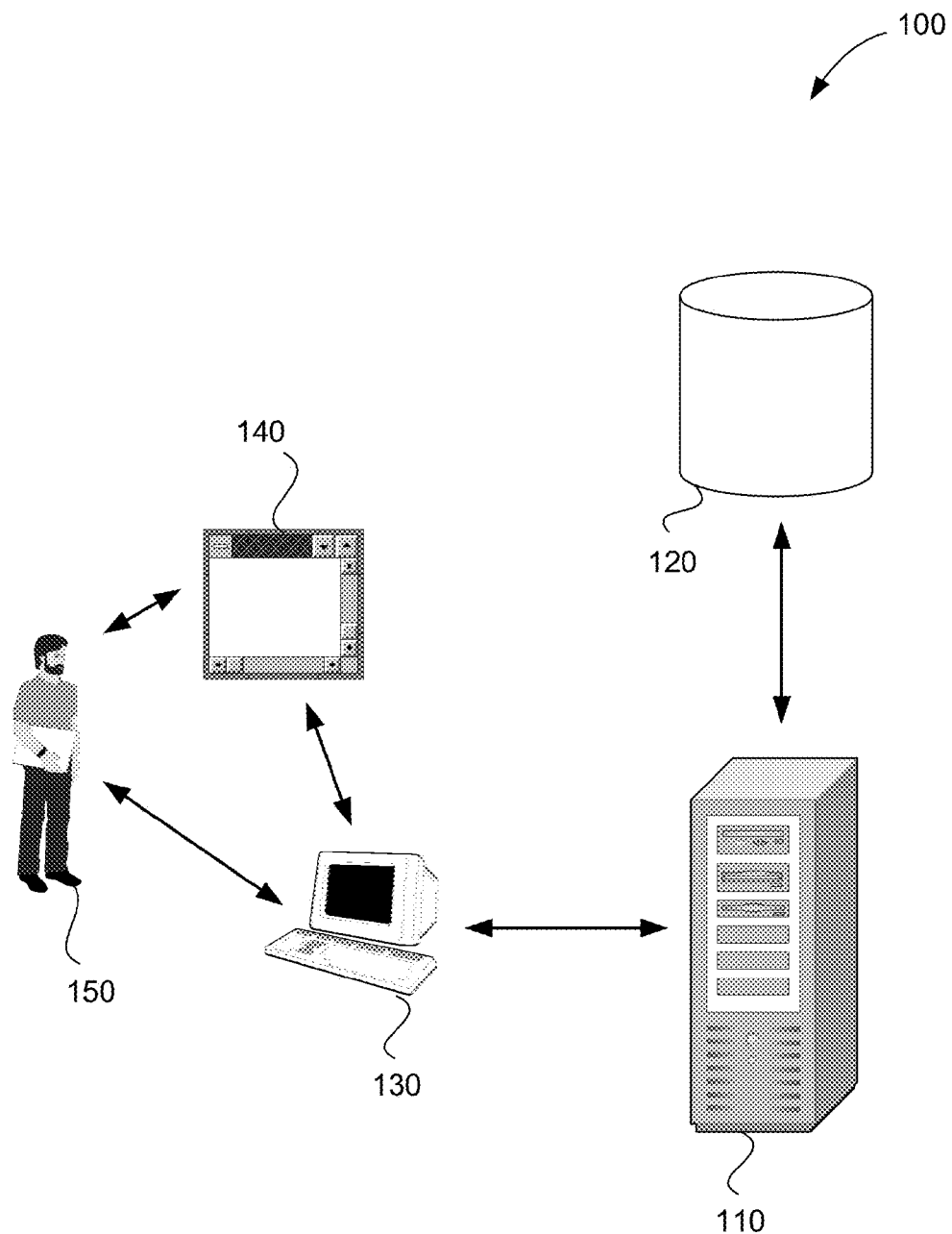
FIG. 1 is a block diagram illustrating an exemplary implementation of a switch investment modeling system, according to one embodiment.

Preferred embodiments according to the present invention may be implemented as systems and methods for modeling one or more communications network switching devices (e.g., a router or a telecommunication switch) and for estimating one or more investments associated with the model device(s). Investments and equipment quantities for model network devices can be provided as component-level output for consideration by a user. The investments may be used for determining cost-effective network design solutions. The calculated investments may also be used in governmental regulatory proceedings to intuitively and accurately justify costs associated with network devices. In addition, among other uses, the investments may be associated with specific network device functions and used to help determine costs of services provided by the networks in accordance with the amount of network resources used by specific network device functions.

Investments and equipment associated with foundational representative model switches can be easily adjusted for sensitivity analyses based on actual switch characteristics and/or hypothetical design parameters, without having to re-generate the equipment or the investment calculations for the foundational model switches each time a switch parameter is adjusted. The representative model offices can be used repeatedly as a foundation for computation of jurisdiction-specific investments or for hypothetical network configurations, thereby saving resources by not having to start calculations from scratch for each variation of inputs.

As used herein, the terms "communications network switching device" and "telecommunication switch" are meant to be understood broadly as including any device used for directing (e.g., routing and/or switching) communication signals over a communications network. The communications network may be any form or type, of network capable of carrying communications signals, including, but not limited to, packet-switched networks such as Internet Protocol based networks and circuit-switched networks such as traditional PSTNs, for example. Communication signals may be in any form capable of being carried on the network. For example, communication signals may include, but are not limited to, known signals used for PSTN communications, data communications, and voice over internet protocol ("VOIP") communications.

An implementation of an exemplary system, as well as exemplary processes performed by the system, will now be described in detail. A listing of the meanings of many of the acronyms used herein is provided in Table 1.

TABLE 1

Acronym Definitions

| | |
|---|---|
| AIU | Access Interface Unit |
| AMA | Automatic Message Accounting |
| BRI | Basic Rate Interface |
| BHAR | Busy Hour to Annual Ratio |
| CCS | Centum (100) Call Seconds |
| CLLI | Common Language Location Identifier |
| DLC | Digital Loop Carrier |
| DS1 | Digital Signal Level 1 |
| DMS | Digital Multiplex System |
| GR303 | Telcordia Generic Requirements #303 for next generation DLC transmission between a switch and an end user, where several DS1 groups are consolidated |
| GTD-5 | General Telephone Digital Class Five, a digital switch technology supported by Lucent Technologies |
| ISDN | Integrated Services Digital Network |
| NCTA | Non-Conversation Time Adjustment |
| 5ESS | Number Five Electronic Switching System |
| POTS | Plain Old Telephone Service |
| PRI | Primary Rate Interface |
| PSTN | Public Switched Telephone Network |
| SS7 | Signaling System Seven |
| SONET | Synchronous Optical Network |
| STS | Synchronous Transport Signal |
| TOPS | Traffic Operator Position System |
| TR008 | Telcordia Technical Requirements #008 for DLC transmissions using individual T1 terminations directly into the switch. |
| VoIP | Voice Over Internet Protocol |

II. Exemplary Implementation

In many embodiments, the system is implemented in one or more computers. The system may include any computer hardware and/or instructions (e.g., software programs), or combinations of software and hardware, helpful for the performance of the switch investment modeling processes described herein. In particular, it should be understood that the system may be implemented on one physical computing device or may be implemented on more than one physical computing device. Accordingly, the system may include any one of a number of computing devices known to those skilled in the art, and may employ any of a number of computer operating systems known to those skilled in the art, including, but by no means limited to, known versions and/or varieties of the Microsoft Windows® operating system, the Unix operating system, and the Linux operating system.

Accordingly, those skilled in the art will recognize that the various processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Turning now to the figures, FIG. 1 is a block diagram of an exemplary implementation 100 of an embodiment of the exemplary system described herein. As shown in FIG. 1, the implementation 100 may include a computer 110 configured to communicate with a data store 120 and an access device 130. The communications can be made using any known type of communication media and protocols, including the Internet and protocols associated therewith. The computer 110 may provide the access device 130 with information useful for presenting a user interface 140 for consideration by a user 150. The user 150 may use the access device 130 and the interface 140 to interact with the computer 110. Each of the elements shown in FIG. 1 will now be described in greater detail.

A. User

The user 150 is typically a human being that can utilize the access device 130 to input information to and/or consider output from the computer 110. However, the user 150 may be another living organism, an automated agent, or some form of intelligence technology that is configured to provide input to the computer 110. Typically, the user 150 is in physical proximity to the access device 130. The user 150 may refer to one or more service provider (e.g., carrier) personnel, network designers, switch engineers, costs analysts, regulatory personnel, compliance personnel, interveners, and others associated with the design, operation, manufacture, maintenance, or compliance relating to network switching devices.

B. Access Device

The access device 130 can include any device or devices physically accessible to the user 150 or that otherwise allow the user 150 to provide input to, receive information from, or access the computer 110. The access device 130 may include but is not limited to one or more desktop computers, laptop computers, tablet computers, personal data assistants, cellular telephones, satellite pagers, wireless internet devices, embedded computers, video phones, mainframe computers, mini-computers, workstations, network interface cards, programmable logic devices, entertainment devices, gaming devices, client devices, and other future devices that may not yet currently exist. The access device 130 may include various peripherals such as a terminal, keyboard, mouse, screen, printer, stylus, input device, output device, or any other apparatus that can help relay information between the user 150 and the computer 110. The access device 130 may be configured to present the user interface 140 for consideration and/or use by the user 150.

The access device 130 may be located proximate or remote to the computer 110. The access device 130 and the computer 110 may communicate using any known media and protocols. In some embodiments, the access device 130 comprises a client device configured to communicate with the computer 110 over a network (e.g., the Internet). In other embodiments, the access device 130 comprises peripheral devices connected to the computer 110.

While FIG. 1 shows only one access device 130, this is for purposes of illustration and not intended to be limiting. Other embodiments may include multiple access devices 130 in communication with the computer 110.

C. User Interface

The user interface 140 may be utilized by the user 150 to access the computer 110 via the access device 130. For example, the user interface 140 may be used to initiate and/or interpret communications with the computer 110. Accordingly, the user interface 140 may include mechanisms for prompting for and receiving input from the user 150. For example, the user interface 140 may include tabs or other visual indicators that are selectable by the user 150. The selection of the tabs may initiate predefined macros or execution of other processes associated with modeling switch investments. The user 150 may also use the user interface 140 to modify inputs, as discussed below.

In an exemplary embodiment, the user interface 140 comprises a graphical user interface ("GUI") capable of displaying data representative of switch modeling processes and information, as well as inputs and outputs associated with the switch modeling processes and information. The GUI may be associated with a software program operating on the computer 110. In some embodiments, the user interface 140 comprises a web form implemented using Hypertext Markup Language (HTML). However, the user interface 140 is not limited to a web form embodiment and can include many different types of user interfaces 140 capable of presenting data to and/or receiving input from the user 150.

While FIG. 1 shows only one user interface 140, this is for purposes of illustration and not intended to be limiting. Typically, multiple user interfaces 140 may be provided through the access device 130.

D. Data Store

The data store 120 may comprise one or more storage mediums, devices, or configurations, including databases. The data store 120 may employ any type, form, and combination of storage media known to those skilled in the art, including hard disk drives, read-only memory, and random access memory. The data store 120 may include any known technologies useful for storing and accessing information. The data store 120 may be integrated with or external of the computer 110. The computer 110 and the data store 120 may communicate using any known media and protocols. In some embodiments, the data store 120 comprises one or more databases.

The data store 120 may be configured to store predefined data, as well as information received from the access device 130. In particular, the data store 120 may store predefined modeling heuristics for processing inputs to model network switch device investments. An exemplary predefined modeling heuristic will be described further below.

E. Computer

The computer 110 can include any device or combination of devices that allows the processing of the system to be performed. The computer 110 may be one or more general purpose computers capable of running a wide variety of different software applications or one or more specialized devices limited to particular functions. In some embodiments, the computer 110 is the same device as the access device 130. In other embodiments, the computer 110 is a network of computing devices accessed by the access device 130. The computer 110 may include any type, number, form, or configuration of processors, memory, computer-readable mediums, peripheral devices, computing devices, and operating systems. The computer may also include bio-computers or other intelligent device (e.g., artificially intelligent device). In some embodiments, the computer 110 is in the form of one or more servers (e.g., web servers), and the access device 130 is a client device accessing the servers.

The computer 110 is capable of executing steps for performing the functionality of exemplary system 200 (described further below), including generating and controlling the user interface 140 and interactions of the user interface 140 with the user 150. In particular, the computer 110 can generate and present data representative of switch models and associated investments to the user 150 by way of the user interface 140. Further, the computer 110 is able to process input received from the user 150 by way of the user interface 140.

While an exemplary implementation 100 of an embodiment of the system is shown in FIG. 1, those skilled in the art will recognize that the exemplary components illustrated in the Figure are not intended to be limiting. Indeed, those skilled in the art will recognize that other alternative hardware environments and implementations may be used.

III. Exemplary System View

Figure 2:
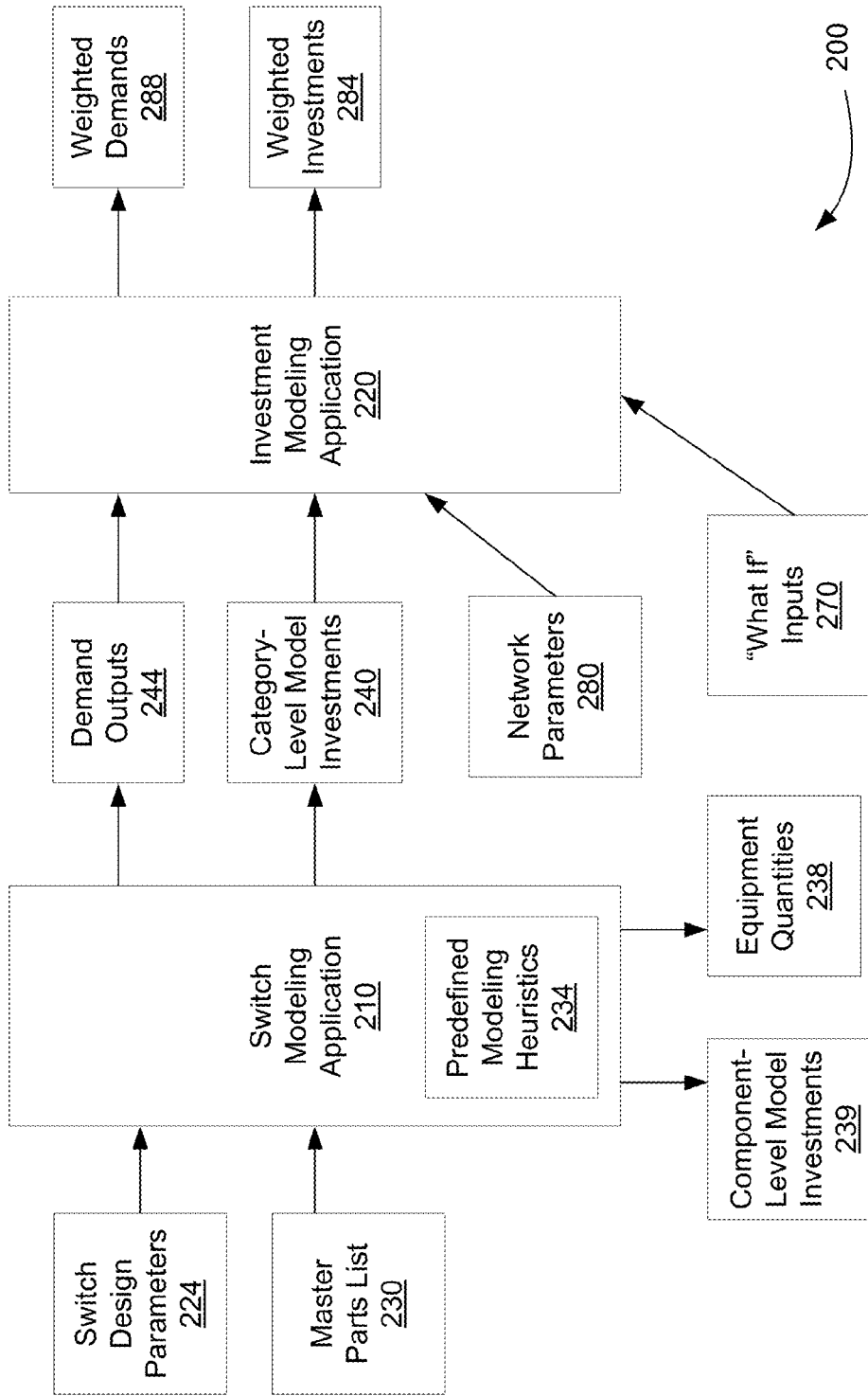
FIG. 2 is a block diagram of an exemplary switch investment modeling system, according to one embodiment.

FIG. 2 is a block diagram illustrating an example of a switch investment modeling system 200 (also referred to simply as "the system 200") that may be implemented to run on the computer 110 of FIG. 1, according to an exemplary embodiment. The system 200 may be implemented as computer-readable instructions (e.g., a standalone software application or group of software applications) configured to run on the computer 110 and stored in a location accessible by computer 110 (i.e., internal to computer 110 or externally accessible to computer 110).

As shown in FIG. 2, the system 200 may include a switch modeling application 210 and an investment modeling application 220. The switch modeling application 210 may accept switch design parameters 224 and one or more predefined master parts lists 230 as inputs. The switch modeling application 210 may be configured to process the inputs in accordance with predefined modeling heuristics 234 to calculate equipment quantities 238, model investments 239 and 240, and demand outputs 244, each of which will be described in detail below.

The model investments 240 and demand outputs 244 may be provided as inputs to the investment modeling application 220, as shown in FIG. 2. The investment modeling application 220 may also receive and use "what-if" inputs 270 and/or network parameters 280 as additional inputs. From the demand outputs 244, model investments 240, network parameters 280, and "what-if" inputs 270, the investment modeling application 220 is able to calculate total and unit forward-looking investments that may be weighted by the network parameters 280 and/or the "what-if" inputs 270, as described below. In FIG. 2, the outputs of the investment modeling application 220 are represented as weighted investments 284 and weighted demands 288. However, the weighted investments 284 and weighted demands 288 may include non-weighted data such as sums of the demand outputs 244 and/or the model investments 240. Each of the items shown in FIG. 2 will now be described in detail.

A. Switch Design Parameters

The switch design parameters 224 may be defined by the user 150 to describe one or more model switches representative of actual switching devices deployed in or designed for use in one or more communication networks. The switch design parameters 224 may include any parameters associated with actual or estimated switch characteristics (e.g., switch sizes) or network traffic characteristics, including any parameters that may influence costs associated with a switch. The switch design parameters 224 can include, but are not limited to, switch technologies, switch applications or types, processor types, line quantities, line technologies, trunk quantities, trunk technologies, average busy hour usage, and other identifiers descriptive of a telecommunications switch.

Switch vendor parameters may identify any vendor of telecommunication switches or components, including Lucent and Nortel, for example. Switch technology parameters may include any description of technology used in switches, such as 5ESS, GTD-5, and DMS, which are known to those skilled in the art. Switch application or type parameters may describe any type of telecommunication switch, including standalone and host end office, remote office, tandem office, and TOPS switches. Line quantity parameters may specify the number of lines associated with a switch and may be separated by line type, such as POTS, Coin, and BRI lines, for example. Line technology parameters may specify any technology used in network lines, including analog and digital (e.g., TR008 and GR303) lines, for example. Trunk quantity parameters may indicate the number of trunks associated with a switch, and may be divided by trunk type, such as interoffice, host-remote umbilical, and ISDN PRI trunks, for example. Trunk technology parameters may specify any technology used in network trunking, including, but not limited to, DS1 and SONET. Average busy hour usage parameters may specify the average usage for lines and trunks during the busy hour of a twenty-four hour cycle within the average busy season. The average busy hour usage may be divided by line type or by trunk type and may be described in terms of CCS, as known to those skilled in the art.

The switch design parameters 224 may include any additional information descriptive of telecommunication switch designs. For example, the switch design parameters 224 may include a remote terminal concentration ratio for GR303 lines, which ratio may represent the number of analog loops entering a remote switch to the number of digital channels leaving the remote terminal.

In one embodiment, the switch design parameters 224 include information descriptive of the number of installed POTS lines, the busy hour CCS per POTS line, the number of installed GR303 lines, the busy hour CCS per GR303 line, the remote terminal concentration ratio for GR303 lines, the number of installed TR008 lines, the busy hour CCS per TR008 line, the number of installed Coin lines, the busy hour CCS per Coin line, the number of installed BRI integrated services digital network ("ISDN") lines, the busy hour CCS per BRI ISDN line, the number of installed GR303 lines, the busy hour CCS per GR303 line, the number of PRI ISDN trunk terminations, and the number of local trunk terminations.

The switch design parameters 224 may be in the form of an input table included in one or more input files, in any suitable form, that may be loaded into the switch modeling application. In many embodiments, the input file is in the form of a comma separated value file (".csv file"), which is known to those skilled in the art.

As mentioned above, the switch design parameters 224 may define one or more representative model switches. Accordingly, the switch design parameters 224 may be predefined to include parameters descriptive of any model switch. A set of representative model switches may be defined as the group of model switches that are describable by different value combinations of the switch design parameters 224.

Typically, the switch design parameters 224 describe a set of representative model switches that have been determined to represent one or more sets of actual telecommunications switches. Instead of having to input parameters for every telecommunications switch in an actual network, the user 150 can identify a set of model switches that can be configured to represent all of the actual switches. This can be done using ranges of switch parameters. In an actual network, switches have different numbers of line terminations, for example. A model switch can be defined to cover a range of line termination quantities. By way of example, a model switch may be defined to cover line terminations in the range of five thousand (5,000) lines to fifteen thousand (15,000) lines. The model switch can then be used to represent any switch having a number of line terminations within this range. The use of a set of model switches generally reduces the number of inputs needed to define the switches. The model switches can be defined independently of any jurisdiction-specific characteristics.

By using select switch design parameters 224 as inputs, the switch modeling application 210 has capabilities to generate investment and equipment outputs from a minimal set of inputs. In many embodiments, the switch modeling application 210 is configured to generate investment and equipment outputs from inputs of no more than approximately forty switch design parameters 224. In contrast, many prior art tools require hundreds of inputs descriptive of a multitude of characteristics of actual switches. However, the system 200 does not sacrifice accuracy for simplicity. Validation tests have frequently shown the system 200 to produce accurate results that are generally within one percent (1%) of vendor investment estimates.

B. Master Parts List

The master parts list 230 may be predefined and may include one or more lists of switch components that may be used in network switching devices. The master parts list 230 can be vendor-specific, technology specific, or divided according to some other parameter. The master parts list 230 may include prices associated the switch components contained therein. For example, POTS line frames for different switch vendors and/or technologies may be listed in the master parts lists 230, along with their corresponding prices (e.g., list, retail, wholesale, and/or contracted prices). The prices typically identify costs associated with procuring switch components from a vendor. The prices may be obtained from vendors or other suitable sources and stored in the master parts list 230.

As described below, the data in the master parts list 230 can be accessible to the switch modeling application 210, which may use the master parts list 230 to calculate the model investments 239 associated with the equipment quantities 238. In particular, the determined quantity of a component may be multiplied by the relevant price contained in the master parts list 230 to determine the corresponding material investment.

C. Switch Modeling Application

The switch modeling application 210 may be configured to accept, or otherwise access and use, the switch design parameters 224 and the master parts list 230 as inputs. The switch modeling application 210 is able to execute predefined modeling heuristics 234 to determine equipment quantities 238 that provide sufficient capacity to satisfy the switch design parameters 224. The predefined modeling heuristics 234 comprise computer-readable logics executable by the computer 110 to calculate equipment quantities 238. The predefined modeling heuristics 234 may be configured to implement a capacity modeling approach, which identifies appropriate capacities to satisfy the switch design parameters 224 and then selects appropriate quantities of switch components that provide the appropriate capacities. The capacity of switch components may be defined by utilization rates (e.g., port or processor utilization rate), busy hour CCS, or any other useful measure of the capacity of a switch component. An exemplary capacity-based modeling heuristic 234 is shown in Table 2 and will now be described in detail.

TABLE 2

Exemplary Predefined Modeling Heuristic

POTS_PACKS = ROUNDUP (LINE_INST_POTS / 32)
IF HOST_REM = H and 107 <= (POTS_PACKS) <= 112
  then AIU66a = 1
  else AIU66A = ROUNDDOWN (LINE_INST_POTS) / (112 * 32))

1. Exemplary Predefined Modeling Heuristic

By way of example, Table 2 lists an exemplary predefined modeling heuristic 234 for determining the number of access interface units ("AIUs") (also referred to as "frames") that will provide sufficient capacity for a model switch defined by the switch design parameters 224. For purposes of illustration, the predefined modeling heuristic 234 of Table 2 is listed in pseudo code. As known to those skilled in the art, AIUs may be used to terminate POTS lines in switches. A typical POTS card may have a capacity of thirty-two POTS lines, and a typical AIU may have a capacity of one hundred and twelve POTS cards. The predefined modeling heuristic 234 of Table 2 takes the number of POTS lines defined in the switch design parameters 224 and divides the number by thirty-two. The result is rounded up to determine the number of POTS cards that will provide sufficient capacity to terminate the number of POTS lines specified in the switch design parameters 224. Next, the predefined modeling heuristic 234 determines from the switch design parameters 224 whether the specified switch type is a host switch. If a host switch is specified in the switch design parameters 224, the predefined modeling heuristic 234 determines whether the number of POTS cards is at least as great as a minimum predetermined threshold and no more than a maximum predetermined threshold. In the predefined modeling heuristic 234 of Table 2, the minimum threshold is one hundred and seven POTS cards, and the maximum threshold is one hundred and eleven POTS cards. If the computed number of POTS cards is within the range defined by the minimum and maximum thresholds, one AIU will be identified for full population. Thus, the predefined modeling heuristic 234 of Table 2 is designed to provide a fully-populated POTS frame when the number of POTS line cards is within a predetermined number of the capacity of the POTS line frame. The predetermined number may be defined based on a cost threshold at which a fully-populated POTS frame becomes less expensive to implement than would using individual parts to build a virtually full frame.

On the other hand, if the above conditions are not satisfied (e.g., the number of POTS line cards is not within the predetermined range, the predefined modeling heuristic 234 will calculate the number of AIUs based on the number of POTS lines specified in the switch design parameters 224. As shown in Table 2, the number of POTS lines is divided by the product of thirty-two and one hundred twelve. The quotient is rounded down to determine the number of AIUs that will provide a sufficient number of terminations for the number of POTS lines specified in the switch design parameters 224.

The predefined modeling heuristic 234 of Table 2 is illustrative of other predefined modeling heuristics 234 for calculating quantities of other switch components, which quantities may also be determined based on component capacity. The predefined modeling heuristic 234 of Table 2 and the other predefined modeling heuristics 234 are preferably designed in accordance with vendor engineering practices. In other words, the capacities of vendor components are designed into the predefined modeling heuristics 234 and used to determine the quantities of switch components that provide sufficient capacity to satisfy the switch design parameters 224. The predefined modeling heuristics 234 may be specific to switch types and/or switch technologies. For example, the predefined modeling heuristics 234 may include specific heuristics for 5ESS switches, GTD-5 switches, and/or DMS switches. The vendor-based component-capacity modeling approach of the predefined modeling heuristics 234 provides accuracy and compatibility between the modeling of switch investments and the actual investments for implementing actual switches.

D. Equipment Quantities

The switch modeling application 210 may be configured to apply the predefined modeling heuristics 234 to the switch design parameters 224 to determine equipment quantities 238 at a hardware component level. For example, the switch modeling application 210 may calculate, among other switch hardware components, the number of line cards, line card shelves, and line frames that provide sufficient capacity to support the number of lines specified in the switch design parameters 224. The equipment quantities 238 may be in any suitable form, including lists of switch components along with their corresponding quantities as determined by the switch modeling application 210.

Examples of switch components that may be included in the equipments quantities 238 include, but are not limited to, announcement cards, audible alarm panels, electromagnetic compatibility kits, access interface unit cabinets, peripheral interface data buses, automatic line insulation test circuit pack spares, administrative modules, automatic message accounting components, digital audio tape unit spares, analog trunk spare circuit packs, announcement units, analog test trunk spares, cabling and framework components, message switch circuit pack spares, optical paddle board spares, network clock oscillator spares, time multiplex switch foundation circuit pack spares, time multiplex expansion circuit pack spares, minimum communications module configurations, full communications module configurations, communications module optical paddle boards, time multiplex expansion circuit packs, color video terminals and printers, trunk and line workstations, common data and control cards, directly connected test units, electromagnetic compatibility kits, line and trunk peripheral fan unit cabinets, additional equipment for directly connected test units, directly connected test unit spares, digital facilities interface model packs, digital line trunk units, digital network unit spares, dataset cabinets, digital service circuit model circuit packs and spares, digital service unit shelves, alarm status units, pilot lamp assemblies, small computer serial interface disk spares, non-vendor supplied test equipment, integrated digital carrier units, peripheral interface data bus groups, integrated digital carrier unit spares, memory circuit packs, BRI line packs, Coin line packs, POTS line packs, local test desk trunks, automatic line insulation test circuit packs, master control centers, modular metallic service unit control circuit packs, modular metallic, service unit distribution circuit packs, digital service unit shelves, metallic line test units, modular metallic service unit metallic access circuit packs, modular metallic service unit shelves, modular metallic service unit spares, metallic test interface bus circuit packs, miscellaneous cabinets, modular metallic service unit scan point circuit packs, modular metallic service unit test access circuit spares, modular metallic service unit test access circuit packs, spare network link interface boards, office alarm units, optical carrier level 3 interface spares, protocol handlers and spares, data fan-out spares, packet switch unit shelves, packet switch unit data fan-out pairs, packet switch unit spares, multiple peripheral interface data bus data fan-out pairs and spares, remote control units, remote control unit modems, remote control unit terminal block assemblies, recent change terminals and printers, remote maintenance units and terminal block assemblies, clock components, flash cards, service announcement system advanced services platforms, service announcement system advanced services platform standard flash card spares, service announcement system base platforms, service announcement system business and residence custom services platforms and standard flash card spares, service announcement system spares, processor spares, switch module control cabinet assemblies and packs, memory circuit packs, SONET group digital network units, additional synchronous transport signal level 1 link equipment, digital service circuit packs for 3-way calling, switching module link and trunk peripheral cabinet assemblies, switching module processor time slot interface units and spares, switching module processor units and message handlers, digital line trunk unit circuits and spares, test access unit consoles, test bus control units and circuit packs, network control and timing link interfaces and spares, traffic and office record printers, transmission control units and spares, time slot interface unit pairs, trunk units, analog trunk unit spares, administrative module spares, analog multi-meters, auxiliary resistor networks, auxiliary resistor boards, spare common data and control card packs, spare integrated services digital network link packs, spare Coin line packs, spare analog line packs, spare ring generator packs, text bus control unit plug-in spares and any other component known to be used as part of or as support for telecommunications switch.

E. Component-Level Model Investments

The switch modeling application 210 may be configured to use the determined equipment quantities 238 to calculate associated component-level model investments 239. Calculations of the component-level model investments 239 may be performed by multiplying the equipment quantities 238 by corresponding prices contained in the master parts list 230. By calculating component-level model investments 239, the switch modeling application 210 is able to provide the user 150 with fine-detail investment outputs at a hardware component level, as well as outputs at higher levels of detail. For example, the component-level investments 239 may be used to calculate total model investments for predefined categories, which are represented by the category-level model investments 240 of FIG. 2.

F. Category-Level Model Investments

Category-level model investments 240 may be calculated by summing the component-level model investments 239 associated with the components assigned to a predefined category. Component-level model investments 239 may be subdivided into separate categories prior to summing into category-level model investments 240. The predefined modeling heuristic 234 may include instructions as to how to divide component-level model investments 239 into categories. For example, an investment for a particular type of access interface unit ("AIU") may be divided into categories by allocating predefined percentages of the investment to select categories, such as POTS line termination and CCS line termination categories.

Categories may be established to coincide with switch hardware functions to allow for determination of switching investments for specific products and services, based on the amount of switch resources used for the products and services. Examples of predefined categories can include, but are in no way limited to, line terminations (e.g., POTS, Coin, BRI, TR008, and GR303 line terminations), trunk terminations (e.g., PRI, local, remote umbilical, and signaling system seven ("SS7") link terminations), trunk CCS, line CCS, central and peripheral processors, multi-port conference circuits, automatic message accounting ("AMA") equipment, common equipment, vendor test equipment, other test equipment, cable and framework components, spares, and feature components. The categories may be technology or type specific. By way of example, a category may be defined for POTS line terminations, and all component-level model investments 239 associated with POTS line terminations can be summed to calculate a category-level model investment 240 associated with POTS line terminations.

Category-level model investments 240 can be used to tie costs of services and products to specific switching hardware resources. Consequently, the investments associated with hardware resources can be factored into the price of services and products in a manner that does not penalize users of other services and products that may not utilize the same switching hardware. The category-level model investments 240 may comprise one or more comma-separated value (".csv") or Excel spreadsheet (".xls") files.

Although not shown in FIG. 2, in some embodiments, component-level model investments 239 and/or equipment quantities 238 may be used as input to the investment modeling application 220. Although not shown in FIG. 2, component-level model investments 239 or category-level model investments 240 may be summed to calculate total switch investments for a set of one or more model switches.

G. Model Demands

The switch modeling application 210 may be further configured to determine demand outputs 244, which include both the actual demands of the model offices and switch capacities based on calculated equipment quantities 238. For example, the demand outputs 244 may specify capacities such as a maximum number of POTS lines or a maximum number of other demand units using any other hardware component(s). The demand outputs 244 may also describe capacities for network traffic, which typically describe maximum traffic loads supported by hardware components of representative switches. The demand outputs 244 may be determined based on the switch design parameters 224, the equipment quantities 238, and/or the predefined modeling heuristics 234. The predefined modeling heuristics 234 typically include logic for identifying capacities of the hardware components identified in the equipment quantities 238. For example, the predefined heuristics 234 may define the number of POTS lines supported in a single frame hardware component.

The demand outputs 244 may comprise categories of capacities based on grouped network hardware. The categories may or may not coincide with the categories included in the category-level model investments 240. The categories of demand outputs 244 may be divided by technology, function, type, or any other suitable characteristic. Examples of demand outputs 244 may include, but are not limited to, processor capacity, processor peripheral capacity, number of SS7 links, AMA capacity, number of installed POTS lines, capacity for POTS lines, unit-level CCS for installed POTS lines, total CCS for installed POTS lines, number of installed GR303 lines, capacity for GR303 lines, unit-level CCS for installed GR303 lines, total CCS for installed GR303 lines, number of installed TR008 lines, capacity for TR008 lines, unit-level CCS for installed TR008 lines, total CCS for installed TR008 lines, number of installed PRI trunks, capacity for PRI trunks, number of installed local trunks, and capacity for local trunks. The demand outputs 244 may include any other information descriptive of hardware capacities of hardware components or traffic capacities supported by the hardware components for a set of one or more model switches. The demand outputs 244 may include any parameter specified in the switch design parameters 224.

As with other outputs from the switch modeling application 210, the demand outputs 244 may be in any suitable form, including one or more comma separated value files (".csv files"). Information in the files may be organized by common language location identifier ("CLLI") codes, which are commonly used in the art to identify switch offices, or by some other identifier of telecommunication switches under study. Inputs into the switch modeling application 210 may also be in any suitable form, including comma separated value files, and may also be organized by CLLI codes or other switch or office identifier.

As described above, the switch modeling application 210 is able to generate equipment quantities 238, component-level investments 239, category-level investments 240, total switch investments (not shown if FIG. 2), and demand outputs 244 that are descriptive of one or more model switches described by switch design parameters 224. The outputs from the switch modeling application 210 may be provided to the user 150 and facilitate convenient and intuitive analysis by the user 150. For example, the user 150 can pinpoint, at a component level, the investments associated with specific hardware components. This allows the user 150 to trace investment costs to specific vendor component and prices.

As shown in FIG. 2, the category-level model investments 240 and the demand outputs 244 may be provided as inputs to the investment modeling application 220, which can aggregate the inputs into total and unit investments and demands and generate weighted investments and demands, as described below. The demand outputs 244 and the model investments 240 may be put into any form suitable for inputs to the investment modeling application 220. In one embodiment, for example, the demand outputs 244 and the model investments 240 may be combined in one or more files, which may be in the form of one or more spreadsheet files that are electronically linked to the investment modeling application 220.

The investment modeling application 220 may be further configured to accept and use additional inputs descriptive of actual or hypothetical telecommunication switch configurations and deployments to weight the demand outputs 244 and/or the model investments 240. For example, the network parameters 280, which generally include parameters of actual telecommunication switch networks, can be applied to the demand outputs 244 and the model investments 240 to generate weighted demands 288 and weighted investments 284, as discussed below. The investment modeling application 220 may also receive and apply "what-if" inputs 270, which generally include inputs descriptive of hypothetical configurations of telecommunication switch networks, to adjust other inputs to the investment modeling application 220 to perform sensitivity analyses for varied input values, as discussed below.

H. Network Parameters

The network parameters 280 may include any information (e.g., engineering data) descriptive of actual configurations and distributions of deployed or designed networks and the switching devices used therein. The network parameters 280 may be specific to particular communication networks or geographical areas of particular networks. For example, actual telecommunication networks often differ by jurisdiction or by type of technologies used in the networks. Accordingly, the network parameters 280 may describe characteristics of actual communication networks that are specific to a jurisdiction (e.g., a governmentally-defined state or territory), geographical area, or technology. In many embodiments, the network parameters 280 comprise state-specific characteristics of actual telecommunication networks and the switching devices deployed therein. Preferably, the network parameters 280 include up-to-date information descriptive of characteristics of an actual switching network for an area or jurisdiction under study.

The network parameters 280 may include, but are not limited to, switch identifiers (e.g., CLLIs), switch vendors (e.g., Lucent and Nortel), switch technology (e.g., 5ESS, GTD-5, and DMS), switch application or type (e.g., host end office, remote, tandem, TOPS switches) line size by line type (e.g., the number of POTS, Coin, and BRI lines), trunk size by trunk type (e.g., the number of interoffice, host-remote umbilical, and PRI trunks), average busy hour usage of lines and trunks, and average number of busy hour calls on lines and trunks. Other embodiments may include additional, fewer, and/or different combinations of actual network and telecommunication switch characteristics. The network parameters 280 may also include information useful for calculating a non-conversation time adjustment ("NCTA") factor and a busy hour to annual ratio ("BHAR"), which terms are well known to those skilled in the art.

The network parameters 280 may be in any form suitable for input to the investment modeling application 220. In one embodiment, for example, the network parameters 280 are in the form of a spreadsheet file (e.g., a ".xls" file). The file may be electronically linked to the investment modeling application 220 such that the contents of the file may be accessed and used by the investment modeling application 220.

The investment modeling application 220 may be configured to use the network parameters 280 in a number of different ways, including applying the network parameters 280 to the demand outputs 244 and the model investments 240 to generate the weighted demands 288 and the weighted investments 284, as described below. Application of the network parameters 280 to the demand outputs 244 and the model investments 240 allows the model switches generated by the switch modeling application 210 to be tailored to different communication networks, including state-specific networks, without having to generate new model switches in the switch modeling application 210 for each different communication network. In other words, the representative model offices generated by the switch modeling application 210 can be repeatedly used by the investment modeling application 220 as a foundation for study of investments for many different telecommunication networks, including networks having different technologies and jurisdictional characteristics. By way of a simple example, an exemplary representative model switch may be described as a ten thousand (10,000) line switch and cover a range of line quantities from five thousand (5,000) to fifteen thousand (15,000) lines. The investment modeling application 220 can adjust the ten thousand (10,000) line representative model switch in accordance with an actual number of lines (e.g., eleven thousand two hundred (11,200) lines) of an actual switch in a jurisdiction under study. The same ten thousand (10,000) line representative model switch may be reused and weighted for a different number of actual lines in another telecommunication network. Thus, the calculation of equipment quantities 238 and associated investments does not have to be completely recalculated from scratch for each different configuration or adjustment of telecommunication networks because the representative model switches are designed to be used as foundations that can be weighted for specific network configurations.

I. "What-If" Inputs

The "what-if" inputs 270 can also be used to adjust or weight the representative model switches described in the demand outputs 244 and the model investments 240. While the network parameters 280 are generally descriptive of actual telecommunication network or switch characteristics, the "what-if" inputs 270 are generally used to describe hypothetical telecommunication switch or network characteristics. The "what-if" inputs 270 may be used by the investment modeling application 220 to adjust, override, supplement, and/or redact other inputs to the investment modeling application 220, including any of the information contained in the demand outputs 244, the model investments 240, and the network parameters 280. In one embodiment, the "what-if" inputs 270 are configured for adjusting any one or more of the following inputs to the investment modeling application 220: line technology splits (e.g., percentages of analog, TR008, and GR303 lines); trunk technology splits (e.g., percentages of STS and DS1 trunks); line and trunk fill factors (described further below); BHAR and NCTA settings; processor and processor peripheral utilizations by office type (e.g., end, tandem, and TOPS offices) and switch technology; switching network characteristics such as number and types of host, remote, tandem, and TOPS offices; switching network characteristics such as number of lines of each switch, line CCS of each switch, number of trunks of each switch, trunk CCS of each switch, number of BRI lines of each switch, number of PRI lines of each switch, number of umbilical lines of each switch, and umbilical line CCS of each switch; select undiscounted investments by switch technology; and discounts for component categories by switch technology.

The weighted demands 288 and the weighted outputs 284 may be calculated by applying the "what-if" inputs 270 to the model investments 240 and/or the demand outputs 244. Accordingly, the "what-if" inputs 270 provide the user 150 with a capability to adjust inputs for hypothetical switch and network configurations and to perform sensitivity analyses for variations to the representative model switches generated by the switch modeling application 210. This allows the user 150 to determine investment costs for many variations of switching components. For example, the user 150 may use the "what-if" inputs 270 to hypothetically swap a switch from a first vendor for a switch from another vendor. The investment modeling application 220 can calculate the outputs based on the adjusted input. The user 150 may compare the outputs for the different vendor components to determine which vendor provides the more cost effective solution. Among other possible uses of sensitivity analyses, the user 150 may utilize the sensitivity analyses to negotiate component pricing with vendors.

The "what-if" inputs preferably can be used to adjust any parameter or characteristic of the representative model switches, including hardware, hardware capacity, traffic demands, and pricing characteristics. Examples of "what-if" inputs include, but are in no way limited to, hardware component discounts, vendor discounts, fill factors, component utilization rates, and technology splits. One or more discounts may be applied at any level of detail. For example, the user 150 may instruct the investment modeling application 220 to apply discounts to a particular component, a group of components, all components from a specific vendor, a type of component, a switch as a whole, all switches of a particular type or technology, and/or across a network of switching devices.

Fill factors refer to definable component utilization rate thresholds. Fill factors may be defined and used to trigger notifications of equipment utilization rates reaching the thresholds defined by the fill factors. For example, a fill factor may be set to approximately an eighty percent utilization rate for a particular network component. When actual utilization of the component reaches the eighty-percent threshold, notification may be provided that an additional component should be added to the relevant network or switch to increase capacity and to alleviate the utilization rate of the first component.

The investment modeling application 220 may be configured to process fill factors to adjust investment and demand outputs. For example, if the user 150 provides a "what-if" input 270 to decrease a particular fill factor threshold and instructs the investment modeling application 220 to process inputs with the adjusted fill factor, the investment and demand outputs will be weighted to reflect the adjusted fill factor. In some cases, the decreased fill factor may result in increased investments because the number of components may be increased to provide additional capacity to keep utilization rates below the fill factor.

The user 150 may also input and/or adjust technology splits to be used by the investment modeling application 220 to determine the weighted demands 288 and the weighted investments 284. Technology splits refer to definable ratios of different technologies that may be used to model network switching devices. In the context of the "what-if" inputs, hypothetical technology splits may be defined by the user 150. The network parameters 280 may also include technology splits descriptive of actual ratios of technologies deployed in network switching devices.

A technology split may define a percentage of a particular technology to be used in a switch. For example, a technology split may define a technology mix of analog, TR008, and GR303 line terminations or a technology mix of trunks for a particular switch under study. By way of another example, a technology split may define ratios of switch types to be used in a particular network. Examples of how technology split inputs may be used by the investment modeling application 220 to calculate weighted outputs will be described below.

The user 150 may apply network parameters 280 and "what-if" inputs 270 (e.g., discounts, fill factors, utilization rates, technology splits, and other input adjustments) through the user interface 140, which may include any mechanism useful for enabling the user 150 to provide and apply input adjustments. For example, the user interface 140 may provide tabs or other actuators from which the user 150 may select to apply an input adjustment. In other words, the "what-if" inputs 270 and/or the network parameters 280 may be input to the system 200 through a user interface, which may be provided by the investment modeling application 220. An exemplary user interface 140 having, among other mechanisms, a general input tab will be described further below.

J. Investment Modeling Application

At a high level, the investment modeling application 220 may be configured to generate forward-looking weighted outputs by applying network parameters 280 and/or "what-if" inputs 270 to the representative model switch outputs generated by the switch modeling application 210. In particular, the investment modeling application 220 may be configured to apply the network parameters 280 and/or the "what-if" inputs 270 to the investment and demand outputs 240 and 244 generated by the switch modeling application 210. This allows raw data produced by the switch modeling application 210, and based on representative model switches, to be applied to specific situations (e.g., specific network deployments) without having to re-generate equipment quantities and investments from scratch for each specific input adjustment. In other words, the model switches provide foundational raw data that can be specifically adapted to or weighted for different network and component specifications by the investment modeling application 220. Accordingly, sensitivity analyses and jurisdictional biasing can be performed quickly, without having to regenerate model switches for each input change.

The investment modeling application 220 may be configured to accept and process the demand outputs 244, the model investments 240, the network parameters 280, and the "what-if" inputs 270 to generate the weighted demands 288 and the weighted investments 284, as shown in FIG. 2. In general, the network parameters 280 and the "what-if" inputs 270 are applied to the demand outputs 244 and the model investments 240 to generate the outputs 288 and 284. Actual network characteristics (e.g., switch type, configuration, and distribution) specified in the network parameters 280 may be used to identify "best-fit" model switches described by the demand outputs 244 and the model investments 240. The network parameters 280 may then be applied to the "best-fit" model switches to produce the weighted outputs.

The demand outputs 244 and the model investments 240 may be processed in a variety of predefined ways to generate the weighted outputs. For example, the investment modeling application 220 may be configured to independently weight different types of switches by switch technologies, technology mixes, operational characteristics (e.g., high CCS or low CCS), and/or switch distributions.

With respect to host end office switches, for example, the investment modeling application 220 may be configured to weight the model investments 240 configured with one hundred percent SONET synchronous transport signal ("STS") trunks with the model investments 240 configured with one hundred percent electrical digital signal level one ("DS1") trunks, at a percentage for each investment specified either in the network parameters 280 or in the "what-if" inputs 270. The trunk melded investments may be adjusted based on a percentage of line termination technology mix (i.e., technology split) specified either in the network parameters 280 or in the "what-if" inputs 270. For example, a percentage of analog, TR008, and GR303 line terminations may be applied to the trunk melded investments. The technology melded investments for both low CCS and high CCS office types may then be aggregated based on the number and distribution of host end office switches. The results may be aggregated to calculate total end office investments by switch technology (e.g., 5ESS, DMS, and GTD-5).

For remote office switches, the investment modeling application 220 may be configured to calculate remote office switch investments, by switch type, based on technology mix and office distribution. The calculation is similar to the calculation for host end office described above, except that a trunk type adjustment is not used because remote offices generally do not have trunks. The model investments 240 for remote office switches may be weighted based on a percentage of line termination technology mix (e.g., analog, TR008, and GR303) specified either in the network parameters 280 or in the "what-if" inputs 270. The technology melded investments for both low CCS and high CCS office types may then be aggregated based on the number and distribution of remote office switches. The results may be aggregated to calculate total remote office investments by switch technology.

The aggregate results may be used to develop network specific (e.g., jurisdiction specific) host and remote office switch discounted total and unit investments, by switch technology. In particular, the investment modeling application 220 may be configured to adjust the host and remote switch aggregate investments described above to match actual line and trunk termination quantities specified in the network parameters 280. The investment modeling application 220 may then combine (e.g., sum) the adjusted host and remote switch investments for different switch technologies (e.g., 5ESS, DMS, GTD-5) to form the weighted investments 284 for host and remote switch types.

For tandem and TOPS office switches, the investment modeling application 220 may be configured to calculate tandem and TOPS office switch investments, by switch type, based on trunk mix and office distribution. The first step entails weighting the model investments 240 configured with one hundred percent SONET STS trunks with the model investments 240 configured with one hundred percent electrical DS1 trunks, at a percentage for each investment specified either in the network parameters 280 or in the "what-if" inputs 270. The calculations may then be aggregated based on the number and distribution of tandem and TOPS office switches.

The aggregate results may be used to develop network specific (e.g., state specific) tandem and TOPS office switch discounted total and unit investments, by switch technology. In particular, the investment modeling application 220 may be configured to adjust the tandem and TOPS switch aggregate investments described above to match trunk quantities specified in the network parameters 280. The investment modeling application 220 may then combine (e.g., sum) the adjusted tandem and TOPS switch investments for different switch technologies (e.g., 5ESS and DMS tandem switches) to form the weighted investments 284 for tandem and TOPS switches.

The investment modeling application 220 may be configured to perform similar processes to weight model investments 240 for other switch components in order to generate weighted investments 284 for the switch components. The weighting processes of the investment modeling application 220 may be configured to use the "what-if" inputs 270 in calculating the weighted outputs, thereby allowing the user 150 to conveniently provide different sets of inputs for comparison and sensitivity analyses.

K. Weighted Investments

The weighted investments 284 may include any information descriptive of model switch investments as modified by one or more actual characteristics of a specific network (as contained in the network parameters 280, for example) and/or by one or more "what-if" inputs 270. The weighted investments 284 may include total or unit investments for particular types, technologies, and usage levels of switching devices, including the above-described aggregated and adjusted investments for host, remote, tandem, and TOPS switches. The weighted investments 284 may be in a form that is compatible with downstream applications configured to determine service costs.

Examples of weighted investments 284 may include, but are not limited to, total investments for processors, processor peripherals, umbilical terminations, line CCS, trunk CCS, trunk terminations, trunk terminations by trunk type (e.g., PRI trunks), line terminations, line terminations by line type (e.g., GR303, analog, TR008, BRI, Coin), ISDN terminations (e.g., PRI and BRI ISDN terminations), multi-port conference components, SS7 signaling link terminations, and switch-specific technologies (e.g., GTD-5, DMS, 5ESS). Weighted investments 284 may also include unit investments for the same items listed above. In addition, the weighted investments 284 may be segregated by switch technology and/or type. For example, any of the above-listed items may be provided specifically for 5ESS switch technology investments, or specifically for tandem type switch investments.

The weighted investments 284 may also include summed or averaged model investments 240 that may or may not have been weighted. In other words, any of the above-listed items may be provided in a summation form rather than a weighted form.

L. Weighted Demands

The weighted demands 288 may include any information descriptive of model switch demands as modified by one or more actual characteristics of a specific network (as contained in the network parameters 280, for example) or by one or more "what-if" inputs 270. The weighted demands 288 may include total or unit demands for particular types, technologies, and usage levels of switching devices, including aggregated and adjusted demands for host, remote, tandem, and TOPS switches. The weighted demands 288 may be in a form that is compatible with downstream applications configured to determine service costs.

Examples of weighted demands 288 may include, but are not limited to, total number of lines by line type and switch technology (e.g., 5ESS, DMS, GTD-5), average line CCS by switch technology, number of trunks by switch technology, average trunk CCS by switch technology, average number trunk calls by switch technology, number of remote umbilicals by switch technology, average umbilical CCS by switch technology, and percentages of line types by switch technology.

The weighted demands 288 may also include summed or averaged demand outputs 244 that may or may not have been weighted. In other words, any of the above-listed items may be provided in a summation form rather than a weighted form.

III. User-Interface View

Figure 3:
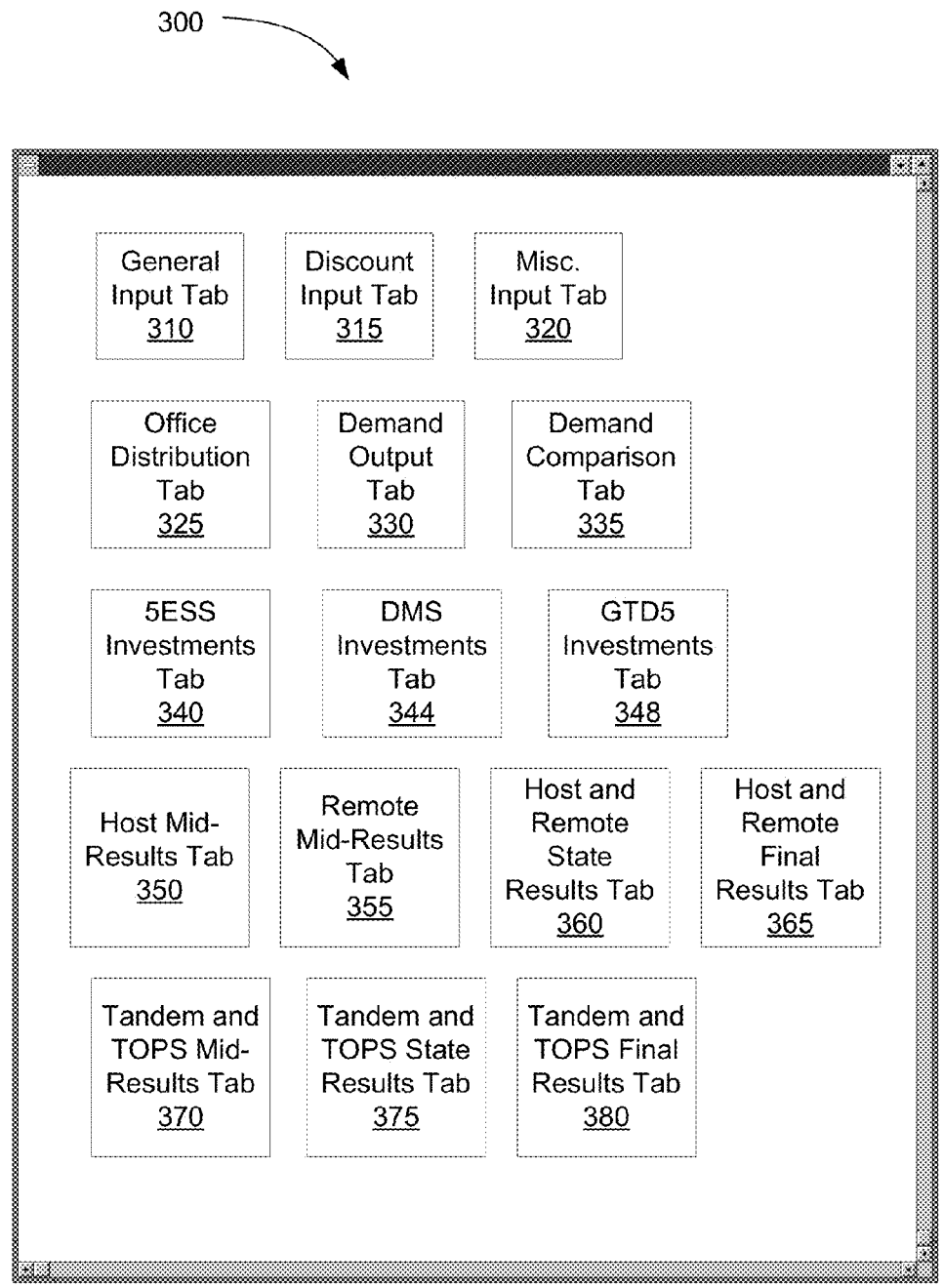
FIG. 3 is a block diagram illustrating an exemplary user interface provided by the switch investment modeling system of FIG. 2, according to one embodiment.

The system 200 may be configured to provide various interactive interfaces to the user 150 via the user interface 140. Both the switch modeling application 210 and the investment modeling application 220 may provide a variety of interactive interfaces. FIG. 3 illustrates an exemplary graphical user interface ("GUI") 300 that the investment modeling application 220 may make available to the user 150. FIG. 3 is illustrative only; many other forms of graphical user interfaces may be provided by the system 200.

As shown in FIG. 3, the GUI 300 may include tabs, or other mechanisms, configured to initiate predefined actions upon being selected by the user 150. The exemplary GUI 300 includes a general input tab 310, a discount input tab 315, a miscellaneous input tab 320, an office distribution tab 325, a demand output tab 330, a demand comparison tab 335, a 5ESS investments tab 340, a DMS investments tab 344, a GTD-5 investments tab 348, a host mid-results tab 350, a remote mid-results tab 355, a host and remote state results tab 360, a host and remote final results tab 365, a tandem and TOPS mid-results tab 370, a tandem and TOPS state results tab 375, and a tandem and TOPS final results tab 380. Each of these tabs and their related functions will now be described in detail.

The general input tab 310 generally functions as a link to the actual network characteristics in the network parameters 280. The general input tab 310 may be used to adjust or override the network parameters 280. For example, the user 150 may utilize the general input tab 310 to modify any state-specific data contained in the network parameters 280. The general input tab 310 may also be used by the user 150 to provide, adjust, or override many of the "what-if" inputs 270. In general, the investment modeling application 220 will automatically integrate the revised inputs into calculations of the weighted outputs 284 and 288.

The discount input tab 315 may be used by the user 150 to input, adjust, or override investment discounts. In general, the investment modeling application 220 will automatically integrate the revised discount inputs into calculations of the weighted outputs 284 and 288.

The miscellaneous input tab 320 may be used to provide, delete, or adjust other inputs to the investment modeling application 220. The tab 320 may be configured as a catch-all for accepting any other inputs not covered by the general input tab 310, the discount input tab 315, or other input tab. In general, the investment modeling application 220 will automatically integrate the revised miscellaneous inputs into calculations of the weighted outputs 284 and 288.

The office distribution tab 325 may include or function as a link to the network parameters 280. The office distribution tab 325 may be used to access and modify the distribution of office switches defined in the network parameters 280.

The demand output tab 330 may be used to initiate any of the weighting processes described above. For example, the demand output tab 330 may be used to initiate a weighting of the demand outputs 244 based on the office distribution for a particular network or state under study. The tab 330 may also be used to weight the demand outputs 244 based on technology splits defined using the general input tab 310.

The demand comparison tab 335 may be selected to initiate a comparison of the demand outputs 244 generated by the switch modeling application 210 with data contained in the network parameters 280. In particular, the demand outputs 244 may be compared with actual network characteristics specified in the network parameters 280.

The 5ESS investments tab 340 may be selected to present the model investments 240 associated with 5ESS components for consideration by the user 150. Similarly, the DMS investments tab 344 may be selected to present the model investments 240 associated with DMS components for consideration by the user 150, and the GTD-5 investments tab 348 may be selected to present the model investments 240 associated with GTD-5 components for consideration by the user 150. Accordingly, the user 150 is able to view model investments 240 by switch technology.

The host mid-results tab 350 may be selected to initiate calculation of host office investments, by switch type, based on trunk mix, technology mix, and office distribution. The calculation may be performed as described above.

The remote mid-results tab 355 may be selected to initiate calculation of remote office investments, by switch type, based on technology mix and office distribution. The calculation may be performed as described above.

The host and remote state results tab 360 may be selected to initiate calculation of state-specific discounted total and unit investments, by switch type. The calculation may be performed as described above to apply the network parameters 280 and/or the "what-if" inputs 270 to the model investments 240.

The host and remote final results tab 365 may be selected to initiate a melding together of calculated switch investments of the different switch technologies (e.g., 5ESS, DMS, GTD-5). The melding may be performed by summing the investments calculated as a result of the host and remote state results tab 360 being selected, as described above.

The tandem and TOPS mid-results tab 370 may be selected to initiate calculation of tandem and TOPS office investments, by switch type, based on trunk mix and office distribution. The calculation may be performed as described above.

The tandem and TOPS state results tab 375 may be selected to initiate calculation of state-specific discounted total and unit investments, by switch type. The calculation may be performed as described above to apply the network parameters 280 and/or the "what-if" inputs 270 to the model investments 240.

The tandem and TOPS final results tab 380 may be selected to initiate a melding together of calculated switch investments of the different switch technologies (e.g., 5ESS and DMS). The melding may be performed by summing the investments calculated as a result of the tandem and TOPS state results tab 375 being selected, as described above.

While FIG. 3 illustrates an exemplary set of tabs that may be provided in the interactive interface 300, other embodiments may include a subset of the tabs, or additional tabs other than those shown in FIG. 3. For example, tabs may be provided for dividing total investments by units of demand or capacity. The unit investments may include investments specific to wholesale, retail, and/or access switch implementations. By way of another example, a tab may be provided for initiating creation of a data table listing all demand outputs 244 and/or demands specified in the switch parameters 280. Another tab may be provided for identifying any constants processed by the investment modeling application 220. Such constants may include information that does not vary by state or network. Yet another tab may be provided for initiating formatting of the outputs of the investment modeling application 220 into suitable form for use as inputs to a downstream service cost application.

In addition, other embodiments of the interactive interface 300 may include tabs or other control mechanisms related specifically to VoIP switching and future telecommunication switching technologies. Tabs or other control mechanisms may also be provided for any switch vendor, type, or technology.

In conclusion, the above-described exemplary systems and methods provide a robust, accurate, and user-friendly tool for modeling switching investments. Because the systems and methods provide component-level outputs, the switch investments are highly usable for readily illustrating the sources of investment calculations. Accordingly, users can conveniently and confidently ascertain the accuracy of the investment calculations. Moreover, the systems and methods provide mechanisms for summing and weighting model switch investments to tailor foundational, representative model switches to specific networks. The systems and methods are also configured to accept and incorporate "what-if" inputs, thereby allowing users to perform sensitivity analyses for hypothetical network and switch configurations. The representative model switches provide foundational models that can be weighted for specific, actual and hypothetical, network configurations, without having to re-generate equipment quantities and investments from scratch for each input adjustment. Thus, the representative model offices can be repeatedly used as foundations for calculating specific and hypothetical telecommunication switch demands and investments. This provides significant savings in man-hours and computer resources, while still providing a high level of accuracy. The systems and methods may be useful for many applications related to telecommunication switches, including, but not limited to, network switch design, network parts procurement, and governmental regulatory filings.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
   at least one telecommunication modeling application configured to:
   determine a plurality of equipment quantities having capacity to satisfy a plurality of switch design parameters descriptive of at least one model telecommunication switch, said at least one model telecommunication switch being representative of at least one actual telecommunication switch;
   calculate a plurality of model investments associated with said plurality of equipment quantities;
   make at least one of said plurality of equipment quantities and said plurality of investments available to a user at a hardware component level;
   have a "what-if" input that is descriptive of a telecommunication switch configuration,
   identify a "best-fit" model investment that is associated to a "best-fit" equipment quantity from said plurality of equipment quantities and that has the capacity to satisfy said telecommunication switch configuration; and
   use said "best-fit" model investment when forming a plurality of weighted investments that is specific to said telecommunication switch configuration.

2. The system of claim 1, wherein said at least one telecommunication modeling application is further configured to weight said plurality of model investments in accordance with a network parameter descriptive of the at least one actual telecommunication switch.

3. The system of claim 2, wherein said at least one telecommunication modeling application is further configured to weight said plurality of model investments in accordance with at least one of a second network parameter descriptive of a second actual telecommunication switch and a second "what-if" input descriptive of a second telecommunication switch configuration, without re-determining said plurality of equipment quantities or recalculating said plurality of model investments.

4. The system of claim 2, wherein said at least one telecommunication modeling application is further configured to determine a plurality of model demands descriptive of capacities associated with said plurality of equipment quantities, and is further configured to weight said plurality of model demands in accordance with at least one of said network parameter descriptive of the actual telecommunication switch and said "what-if" input descriptive of the telecommunication switch configuration to form a plurality of weighted demands that is specific to at least one of the actual telecommunication switch and the telecommunication switch configuration.

5. The system of claim 1, wherein said at least one telecommunication modeling application is further configured to group said plurality of model investments into a plurality of categories, each of said categories being associated with a different second network function of the at least one model telecommunication switch.

6. The system of claim 1, wherein said "what-if" input includes at least one of a hardware component discount, a fill factor, and a technology split.

7. The system of claim 1, further comprising a plurality of predefined, capacity-driven modeling heuristics configured to be applied to said plurality of switch design parameters to determine said plurality of equipment quantities.

8. The system of claim 1, wherein said at least one telecommunication modeling application is further configured to group said plurality of model investments into a plurality of categories, each of said categories being associated with a different hardware-related function of the at least one model telecommunication switch.

9. The system of claim 1, wherein said at least one telecommunication modeling application is further configured to weight said plurality of model investments in accordance with a network parameter descriptive of the actual telecommunication switch.

10. The system of claim 9, wherein said at least one telecommunication modeling application is further configured to weight said plurality of model investments in accordance with at least one of a second network parameter descriptive of a second actual telecommunication switch and a second "what-if" input descriptive of a second telecommunication switch configuration, without re-determining said plurality of equipment quantities or recalculating said plurality of model investments.

11. The system of claim 9, wherein said at least one telecommunication modeling application is further configured to determine a plurality of model demands descriptive of capacities associated with said plurality of equipment quantities, and is further configured to weight said plurality of model demands in accordance with at least one of said network parameter descriptive of the actual telecommunication switch and said "what-if" input descriptive of the telecommunication switch configuration to form a plurality of weighted demands that is specific to at least one of the actual telecommunication switch and the telecommunication switch configuration.

12. The system of claim 9, wherein said "what-if" input includes at least one of a hardware component discount, a fill factor, and a technology split.

13. The system of claim 1, wherein said plurality of switch design parameters includes at least one of a switch technology, a switch application, a switch type, a processor type, a line quantity, a line technology, a trunk quantity, a trunk technology, an average busy hour usage, and a vendor of telecommunication equipment.

14. The system of claim 1, wherein said plurality of equipment quantities includes a list of switch components along with their corresponding quantities.

15. The system of claim 1, further comprising:
 a master parts list including indications of switch components and corresponding prices associated with said switch components by said at least one telecommunication modeling application; and
 a plurality of system investments associated with said plurality of equipment quantities using said at least one telecommunication modeling application based on the "best-fit" equipment quantities and corresponding prices.

16. The system of claim 1, further comprising at least one of total investments and unit investments in said weighted investments according to at least one of switch type, switch technology, and switching device usage level.

17. The system of claim 1, wherein said plurality of weighted investments include at least one of investments for: processors, processor peripherals, umbilical terminations, line centum call seconds, trunk centum call seconds, trunk terminations, trunk terminations by trunk type, line terminations, line terminations by line type, integrated services digital network terminations, multi-port conference components, signaling system seven signaling link terminations, and switch-specific technologies.

18. The system of claim 1, wherein said "what-if" input is configured to cause said at least one telecommunication modeling application to swap a model telecommunication switch from a first vendor for a model telecommunication switch from another vendor.

* * * * *